United States Patent
Parodi et al.

(10) Patent No.: US 9,243,211 B2
(45) Date of Patent: Jan. 26, 2016

(54) SEPARATE COLLECTION AND CONVERSION METHOD AND PLANT FOR THE REUSE OF NATURAL AND/OR SYNTHETIC ESTER-BASED OILS OR GREASES OF INDUSTRIAL ORIGIN FOR ENERGY PURPOSES

(75) Inventors: Augusto Parodi, Genoa (IT); Leandro Marini, Ceranesi (IT)

(73) Assignee: A & A FRATELLI PARODI, S.p.A. (IT)

( * ) Notice: Subject to any disclaimer, the term of this patent is extended or adjusted under 35 U.S.C. 154(b) by 0 days.

(21) Appl. No.: 14/007,388

(22) PCT Filed: Mar. 30, 2012

(86) PCT No.: PCT/EP2012/055758
§ 371 (c)(1),
(2), (4) Date: Sep. 25, 2013

(87) PCT Pub. No.: WO2012/131020
PCT Pub. Date: Oct. 4, 2012

(65) Prior Publication Data
US 2014/0024847 A1    Jan. 23, 2014

(30) Foreign Application Priority Data
Apr. 1, 2011    (IT) ................. GE11A00035

(51) Int. Cl.
*C11B 13/00* (2006.01)
*C11C 1/08* (2006.01)
*C11C 3/06* (2006.01)
*C11C 3/00* (2006.01)

(52) U.S. Cl.
CPC . *C11B 13/00* (2013.01); *C11C 1/08* (2013.01); *C11C 3/003* (2013.01); *C11C 3/06* (2013.01); *Y02W 30/74* (2015.05)

(58) Field of Classification Search
CPC ............................... C11B 13/00; C10G 73/00
See application file for complete search history.

(56) References Cited

U.S. PATENT DOCUMENTS

| | | | |
|---|---|---|---|
| 6,132,596 A * | 10/2000 | Yu | ................................. 208/179 |
| 7,175,115 B1 | 2/2007 | Gali | |
| 2005/0006290 A1 | 1/2005 | Patten | |
| 2010/0166620 A1 | 7/2010 | Gurski et al. | |

* cited by examiner

Primary Examiner — Yate K Cutliff
(74) Attorney, Agent, or Firm — Fish & Tsang, LLP

(57) ABSTRACT

Separate collection and conversion method and plant for the reuse of used oils and greases for energy purposes, which method provides one or more of the following steps: —producing and separating the waste from other substances or compounds, —collecting the waste—gathering/storing the waste in at least a collection and/or regeneration facility, —regenerating or treating the waste, —reusing the collected or regenerated or treated waste, an oil or a grease or a mixture containing at least a natural and/or synthetic ester-based oil and/or grease being considered as waste, which oil or grease or which mixture is the by-product or waste of industrial processes.

7 Claims, 3 Drawing Sheets

SEPARATE COLLECTION AND CONVERSION METHOD AND PLANT FOR THE REUSE OF NATURAL AND/OR SYNTHETIC ESTER-BASED OILS OR GREASES OF INDUSTRIAL ORIGIN FOR ENERGY PURPOSES

The present invention relates to a collection and conversion method and plant for the reuse of used oils or greases for energy purposes.

Mineral oils, synthetic oils, vegetable esters, silicone oils, animal fats, mineral greases, soaps, etc. are used in industry for several applications. These substances are mainly used as lubricants.

Said substances can be used as mixtures and with additives in order to improve their chemical and physical properties such to enhance their performance or to make them emulsifiable by mixing them with surface-active agents such that they can be mixed with water and used, for example in metal cutting.

Lubricating oils are usually composed of a base stock and of a series of additives (generally from 10 to 30% by volume) which can be of mineral, semisynthetic, or synthetic origin. The additives serve as, for example, viscosity improvers, pour-point depressants, foam inhibitors/demulsifiers. They also extendthe life of lubricants (by inhibiting oxidation) and improve the properties of lubricants (anti-wear agents, detergents, dispersants, corrosion inhibitors).

The base stocks, which compose the oil can be of different origins:
  mineral: obtained from the refining of crude oil,
  hydrogenated or semi-synthetic mineral: obtained by hydrogenation from mineral base stocks or natural gas,
  synthetic: obtained by a chemical synthetic process and not from hydrocarbons (ex. polyalphaolefins), and
  re-refined: obtained by the collection of vegetable esters and used oils subjected to re-refining and readditivation processes.

Lubricants are mainly applied for:
  Motor and nautical industry (motor oils, gearbox oils),
  Earth-moving machines (hydraulic oils),
  Steel industry (mineral and synthetic hydraulic oils, gear oils, greases),
  Paper factories (hydraulic oils, greases),
  Plastic materials (hydraulic oils, synthetic esters),
  Metal quenching,
  Electrical transformer industry, and
  Tannery industry (natural oils and synthetic esters, greases).

Once the above mentioned products have been spent, they are collected as "waste" by authorized and specialized companies.

Hundreds of thousands of tons of used mineral oils are collected by specialized companies that, in Italy, are within the C.O.O.U. (Consorzio Obbligatorio Oli Usati—the Statutory Consortium of Used Oils).

Consortiums like the C.O.O.U. are present throughout Europe. For example the French agency is ADEME.

It should be appreciated that the term "used mineral oils" includes, in addition to the mixture of hydrocarbons that are the base component, the additives (anti-oxidants, anti-wear additives, those improving the resistance to loads, acid neutralizers, emulsifiers, oiliness improvers, freezing point depressants, viscosity index improvers, bactericides, rust inhibitors, thickeners, etc.) that are usually not present in high percentages, therefore representing a small percentage of the mixture, equal to the hydrocarbon degradation products present therein.

The European Community has decided to regulate the matter of the disposal and reuse of used lubricating oils by means of the Community Directive 75/439/EEC dated as of Jun. 16, 1975.

However, such directive was only really implemented in Italy in 1982 by setting up the Statutory Consortium of Used Oils.

On Dec. 22, 1986, the directive n. 87/101/EEC was issued and introduced a new definition for used oil by defining new obligations for companies processing such oils.

Only by legislative decree 95/1992 have the standard regulations become more systematic by clarifying competences, authorizations, and methods activities for performing the activities for the collection and disposal of used oils.

The DM 392 dated as of May 16, 1996 introduced new technical rules concerning the disposal of used oils. Above all, it defined the analytical parameters to be determined for defining the proper destination of oils.

By the issuance of legislative decree 22/1997, later modified by the legislative decree 389, used mineral oils and emulsions fall within the class of hazardous waste.

Regeneration is the process that best exploits the collected product, since it allows the used oil to be converted into a regenerated lubricant base, having qualitative properties that are similar to those of the lubricant bases that are directly obtained by the processing of the crude oil.

The regeneration has a high yield: starting from 100 kg of used oil, it is possible to obtain about 60 kg of regenerated base oil and 20/25 kg of gas oil/fuel oil (light fractions).

Since 1984 the Statutory Consortium of Used Oils has operated to ensure the collection and the proper reuse of used lubricating oils, and for informing the public about the risks resulting from their leakage into the environment.

The collection activity has increased from 50,000 tons in 1984 to 194,209 tons of used oils in 2009, and in 27 years of activity, the Consortium has recovered a total of more than 4.34 millions of tons of used oil, saving at least 2 billion euros in the Italian electricity bill.

This result has allowed more than 99,800 tons of lubricating bases/year to be produced by the regeneration process.

Therefore, in Italy lubricants deriving from industrial activities are collected.

Since used oils collected are classified as "lubricating oils" there is no distinction between mineral oil that is "hydrocarbon based" oil and (natural or synthetic) "ester based" oil.

Then it has to be noted that the plant producing the waste, does not separate the "waste with mineral-based oil" from the waste with "ester-based oil" during the waste production phase. Thus, the used oil is necessarily a mixture of hydrocarbons and esters, in addition to additives and their decomposition products.

Moreover, the exact amounts of natural or synthetic esters used in industry are not known.

Currently it is estimated that in a collection of 200,000 tons of lubricating oil, the "ester" portion is about 10-15%.

Considering that the industry is not able to keep used mineral lubricants separated from ester based ones, in Italy for example, it has been estimated that from 20,000 to 30,000 tons of used ester-based oils improperly fall within used mineral oils that are collected to be sent to the regeneration process.

In addition in the field of the regeneration of used oil, it has to be considered that the trend is to use products that are biodegradable and that do not have an environmental impact or that have the lowest environmental impact.

The regulation (EC) n. 1907/2006 by the European Parliament and the Council, about the Registration, Evaluation, Authorisation and Restriction of Chemical substances (REACH) provides for products that are toxic and harmful for human beings, animals, and the environment to be replaced by products having a lower environmental impact. This standard will only stimulate and develop the use of substances of vegetable origin having a lower environmental impact, a fact that is already applied in the field of thermal treatment of metals and in the field of transformers.

It is known that, in spite of the regeneration, sooner or later hydrocarbons constituting the base of mineral oils will end up being converted into carbon dioxide due to combustion of oils that cannot be regenerated in the thermal destruction process. Thus, a high percentage of this gas will be released into the environment resulting in the greenhouse effect, that is, the increase in the globally averaged temperature.

Therefore in order to overcome the greenhouse effect, the substances not derived from crude oil or from petrochemistry might be used as lubricants, that is, lubricants obtained by natural raw materials, essentially vegetable ones, which have been obtained by exploiting the solar energy and the carbon dioxide in the air.

Therefore, there is an increase in the use of natural or synthetic ester-based lubricants, in order not to contribute to increasing carbon dioxide in the environment by using non-fossil carbon sources.

Moreover, it has to be noted that ester-based oils are completely biodegradable in case of leakage in the environment, whereas a mineral-based lubricant remains in the environment for a very long time, leading to a noise and chronic pollution.

The use of mineral oils leads to the generation of cancer-causing and mutagenic substances.

Below a summary table is represented, which shows the content of polycyclic aromatic hydrocarbons (PAHs) within new and used quenching oils.

The table shows the level of danger of said oils.

| PAHs ppm | NEW OIL | USED OIL |
|---|---|---|
| benzo(a)anthracene | 10 | 240 |
| chrysene | 5 | 275 |
| benzo(e)pyrene | 12 | 25 |
| benzo(a)pyrene | 3 | 5 |
| benzo(b)fluoranthene | 2 | 30 |
| benzo(k)fluoranthene | 1 | 2 |
| benzo(c)fluorene + pyrene | 9 | 115 |
| 5 methyl chrysene | 2 | 125 |
| PAHs total | 48 | 820 |

The harmful hydrocarbons listed above are present, for example in the quenching oil, and also in the working environment. For example, within a suction hood of a quenching plant, it has been verified that it is possible to find a content of PAHs equal to 0.08 mg/m$^3$, an amount eight times greater than the limit allowed by the law (0.01 mg/m$^3$).

The same increase in the amount of PAHs is found in environments where cutting oil is used: in the contact point between processed metal-tool, said oils undergo a high thermal shock that cause substances harmful for the environment and the human beings to be generated.

The report by IPCS INCHEM (International Program for Chemical Safety) containing documents of the United Nations Environment Programme, International Labour Organisation and World Health Organization, confirms that many oils used for processing metals become dangerous after an extended use, because of the very high increase in the above mentioned compounds.

Said dangerous compounds are not present in ester-based lubricants, both in new and used ones and in very stressed or old ones.

Natural or synthetic ester-based oils are renewable, ecological, and biodegradable products. Due to such reasons, they are used, for example, in transformers operating outdoors where there is a greater risk of environmental pollution.

C.E.I. standards provide for mineral oils from transformers to be replaced by equal natural or synthetic-based ester oils for outdoor applications (pole transformers, railways, etc.), wherein casual leakages into the environment can generate serious environmental damage.

On the market, there are provided biodegradable vegetable oil-based and biodegradable synthetic ester-based ecological greases to be used as a lubricant with a low environmental impact in agricultural equipment, apparatuses for cutting marbles, apparatuses working in nature reserves, water purification plants, or in other cases when the environment has to be protected.

Therefore, the trend is to reduce the use of mineral oils.

Such trend will lead to the increase in the use of natural or synthetic ester-based oils.

Therefore, the increase in the use of ester-based lubricating oils is destined to grow in order to reduce the use of substances that are dangerous for living beings and for the environment.

Consumptions being equal, this increase would lead bodies dealing with the management of collection, regeneration and disposal of used oils (for example C.O.O.U.) to face an increase, within the mixtures of used oils (that is mixtures of mineral oils and ester-based oils), of the fraction of ester-based oils with a consequent reduction in the percentage of regenerated mineral oils, and an increase of the portion rejected after the regeneration process, a portion that will be disposed only by thermal destruction.

In Italy the consortium for the disposal of used oils has also introduced the "saponification number" for oils suitable for being regenerated within the parameters employed for accepting used oils, in order to try somehow to set a limit to the presence of such substances that are considered waste (namely, ester-based oils that get in the mixture constituting the waste but that do not get into the mixture portion that can be subjected to the regeneration process), as it can be seen in the specifications below concerning oils accepted by said Consortium, as oils suitable for being regenerated.

| | | COOU SPECIFICATIONS | | | |
|---|---|---|---|---|---|
| | | Regenerable | | Combustion | |
| | Unit of measure | Limit DM 392/96 | Average value 2009 | Limit DM 392/96 | Average value 2009 |
| Water | % p | 15 | 8.3 | 15 | 10.9 |
| PCBs | ppm | 25 | 5 | 50 | 6 |
| Total chlorine | ppm | 5000 | 847 | 6000 | 2935 |
| Diluents | % v | 5 | 2.7 | — | — |
| Saponification number | mg KOH/g | 18 | 11 | — | — |
| Flash point | ° C. | — | — | min 90 | 100 |

If such specifications are not met, the oil can fall within the ranges of the specifications for oils that are used for fuel in cement factories, namely the specifications of oils not suitable for the regeneration.

If they are out of specification even as regards thermal destruction (the typical out of specification of chlorine), they are burnt into specific plants equipped with specific systems for lowering undesired compounds (for example hydrochloric acid if the chlorine content is very high).

Therefore, the increase of ester-based used oils in mixtures of used oils suitable for regeneration, due to the propensity to increase the use of such oils in industrial processes, is particularly disadvantageous, since it causes waste collection and treatment costs to increase without leading to an increase in the amounts of regenerated oil.

Moreover, the ester-based used oil in the treatment process described above is considered as a poor waste since it is suitable only for the production of heat by thermal destruction.

On the basis of the processes described above, once the cycle of use has come to an end, it goes into the waste mixture as a portion that cannot be regenerated.

The increase in the use of ester-based oils, therefore, will lead to a reduction in environmental risks but it will increase the amount of used oil rejected from the regeneration process, therefore undoing both the benefits deriving from the regeneration process (the increase in the cycle of use of a product) and the benefits deriving from the use of biodegradable and ecologically sustainable substances (ester-based oils would simply become a waste to be disposed by combustion consequently with the emission of carbon dioxide into the environment).

In addition to the comments above in regard to lubricants, it has to be noted that the EEC standards for second generation biodiesel provide for biodiesel generated from natural waste (vegetable or animal) to have value worth twice (a value intended as the ratio between obtained (gained) energy and consumed (invested) energy) that of biodiesel generated only from oils deriving from crops.

First generation biofuels were those from food crops as raw materials. Sweet corn, soybean, palm, and sugarcane are all excellent easily usable sources of sugars, starches, and oils.

As regards first generation biofuels, there are many major problems that are well reported and they range from energy losses, net of greenhouse gas emissions, to an increase in the prices of food products.

As regards waste, different processing and/or recovery methods are known.

U.S. Pat. No. 7,175,115 describes a method for processing solid waste and municipal sewage.

The document discloses a method for the recovery of valuable materials from solid waste from solid waste and the conversion of organic solid waste and sewage into crude oil, gas, usable elemental solids, and water.

The method uses a two step process, solid waste reduction and an organic fusion process.

Solid waste requires processing for removal of non-organic products and the preparation of the organics.

Solid waste organics include plastics, papers, food and yard waste, organic construction debris, waste oils, many household, and commercial chemicals, anything with a hydrocarbon molecular structure.

Solid waste is processed through grinders, electro-magnetic sorting, eddy current sorting, and trommels to remove inorganic materials.

The organics are then sent through a series of grinders before being mixed with waste water to produce the sludge for organic fusion processing.

The organic solids and water create a sludge, which is injected into a medium heated closed chamber.

The increased temperature and pressure fuses the water into the organics (a complex molecular compound).

The fused organic and water mixture is then released into a low pressure, lower temperature diffusion reactor. The water changes state into steam. The energy of the steam breaks down the complex organic molecular structures.

Expansion of the materials in the diffusion chamber releases gases, steam, carbons, hydrocarbons, and various types of solid sedimentation.

The steam, inorganic, and organic gases are vented off. A separation process is used to recover combustible gases that can be burned to produce heat and electricity.

The remaining solids are moved through a dryer.

The remaining dried solids consist of hydrocarbon and elemental structures.

The hydrocarbon rich elemental solids are moved into a Fracturing reactor in which all hydrocarbon compounds are in a vapor state. The gases are cooled forming crude oil and natural gases, the solids are sent to a storage bin.

Energy is obtained from municipal waste by means of this process.

This patent does not describe a method and a plant for the separate collection of natural and/or synthetic ester-based oils or greases of industrial origin.

In particular, fuel derived from waste by thermal cracking technology, as in the patent described above, cannot be considered as biodiesel since it derives from the thermal decomposition of substances of chemical origin, while biodiesel has to derive from renewable sources and it has to meet ASTM specifications.

The document US 2005/0006290 discloses a process to reclaim used waste fryer oil used for cooking and convert it into biodiesel. The application does not describe a method for the separate collection of vegetable or animal-based products of industrial origin, which products can be reused for energy purposes.

The document US 2010/0166620 discloses a system and process for continuous production of fatty acid methyl esters (FAME) from the fatty acid triglycerides of waste oil via transesterification in the presence of a reusable sugar-based catalyst. The system and process incorporate re-cycling and re-use of waste by-product streams to result in near-zero emissions, with a 97% product yield mix and a very small percentage of impurities including glycerol.

The application relates to a plant and a process for producing biodiesel by neutralization of fryer oil, esterification of glycerol, transesterification, and distillation, but it does not relate to a method for the separate collection of waste that can be converted and reused for energy purposes.

The present invention relates to a method allowing ester-based oils/greases resulting as a by-product or as a waste of industrial processes to be selectively collected in order to obtain an ecologically sustainable energy source from said oils/greases.

Natural and/or synthetic ester-based oils/greases do not contain mineral oil and/or hydrocarbon derivatives.

Said oils/greases are PAH-free (Polycyclic Aromatic Hydrocarbons) that have a carcinogenic effect on human beings.

Therefore, the present invention relates to a method for the separate collection and conversion for the reuse of used oils and greases for energy purposes, which method provides one or more of the following steps:
- producing and separating the waste from other substances or compounds,
- collecting the waste
- gathering/storing the waste in at least a collection and/or regeneration facility,
- regenerating or treating the waste,
- reusing the collected or regenerated or treated waste, and
- an oil or a grease or a mixture containing at least a natural and/or synthetic ester-based oil and/or grease being considered as waste, which oil or grease or which mixture is the by-product or waste of industrial processes.

Therefore, according to the present invention, the waste is composed of base of ester nature mixed with additives and with their decomposition products.

According to the method of the present invention the step of producing and separating waste provides natural and/or synthetic ester-based oils/greases to be separated from oils/greases with a different non-biodegradable base, particularly a mineral base.

By the present invention the mineral oil collected by the consortiums for the collection of used oils, such as C.O.O.U. (Statutory Consortium of Used Oils), and suitable for the regeneration, will be not contaminated by natural or synthetic ester-based oils anymore, and such separation of mineral oils and ester-based oils will lead to a greater production output in the used mineral oil regeneration process.

It is necessary to separate mineral oils from ester-based oils before treating them, since esters mixed with mineral oils cannot be distilled and remain as pitches, thus increasing the bulk.

Then the method provides the collected oils/greases to be divided according to different types, depending on their chemical-physical composition (that takes into consideration the additives mixed with the base and the by-products present in the mixture that have been developed during the life and due to the use of the oil, for example oxidation products).

After a suitable chemical characterization, the separation will serve for defining the destination of the collected waste: regeneration, a treatment allowing the waste to be used as a fuel for producing electrical energy, a treatment allowing the waste to be used as a base for producing biodiesel, in particular second generation biodiesel (so called Double Counting Biodiesel), thermal destruction with the production of heat.

The current European standard prEN16214-1:2010 by the EUROPEAN COMMITTEE STANDARDIZATION does not consider used ester-based oil as a possible raw material for producing second generation biodiesel. On the contrary, other products are considered waste for obtaining biodiesel, such as by-products produced both during oil refining processes and during transesterification processes, crude glycerine, animal fats, crude oil, and fried oils.

Therefore the present invention allows a product, namely natural and/or synthetic ester-based oils/greases to be converted, during the process collecting and reusing used oils, from waste not suitable for being separately collected, destined to go into the used mineral oil mixture as a waste component, decreasing the quality of the waste (since it contaminates the used mineral oil making it not suitable for the regeneration), to a new waste suitable for the separate collection, usable for energy purposes.

The object of the present invention is also a plant allowing the method described above to be applied that allows waste oils to be collected and reused, particularly natural and/or synthetic ester-based oils/greases to be reused.

These and other characteristics and advantages of the present invention will be more clear from the following description and annexed drawings wherein.

Figure 1:
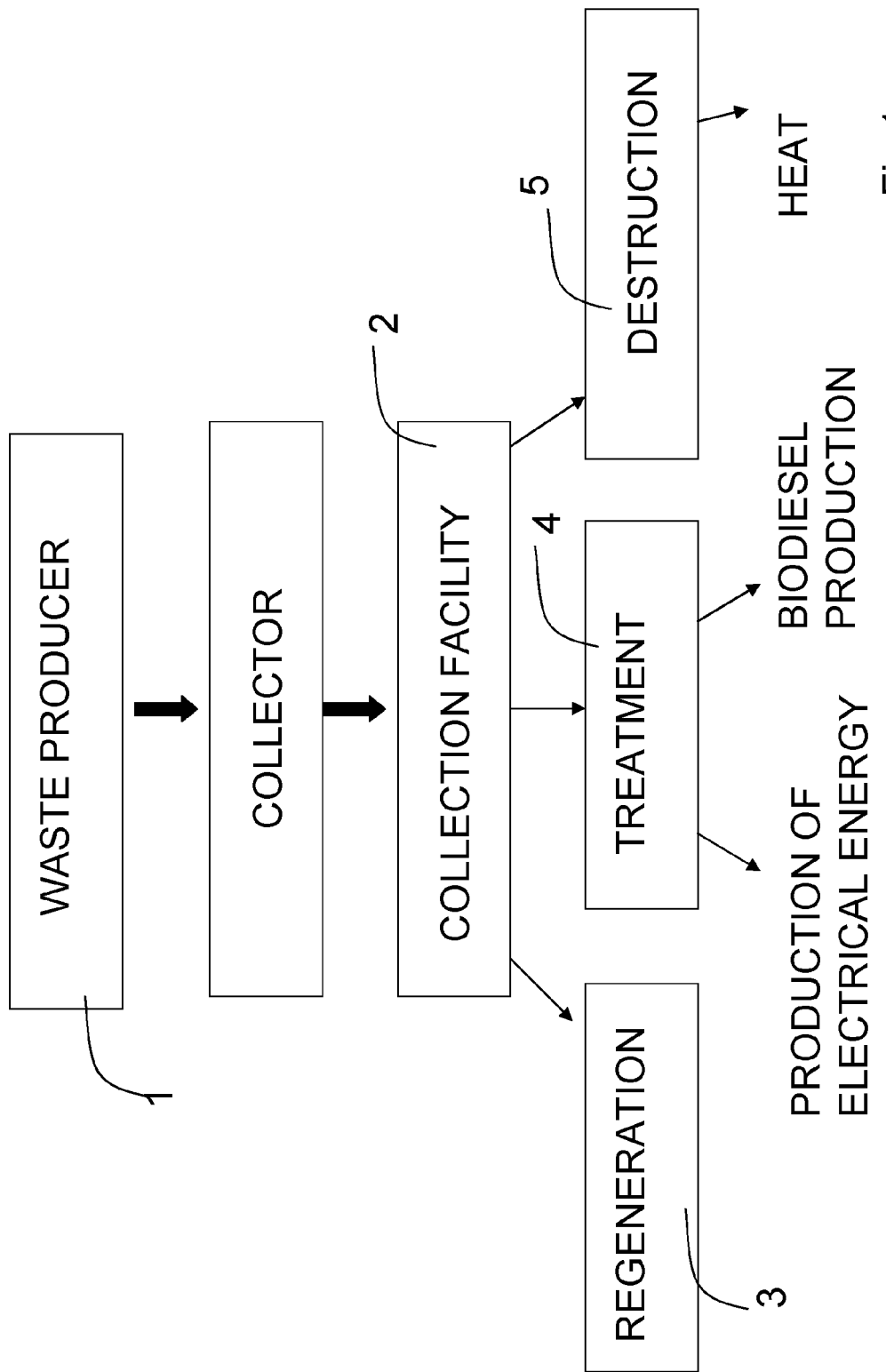
FIG. 1 is a block diagram showing the method steps of the present invention.
Figure 2:
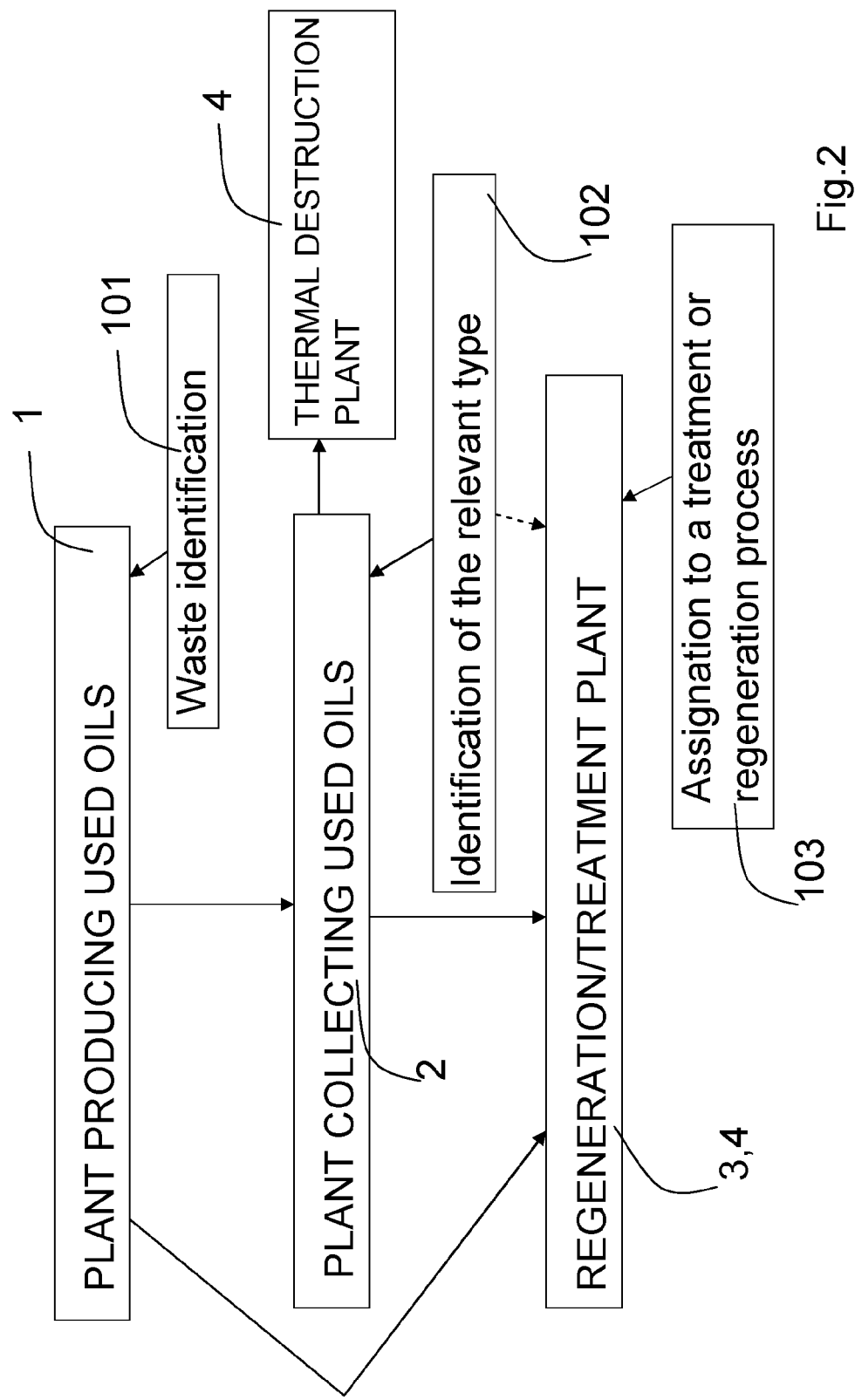
FIG. 2 is a block diagram showing the steps for the chemical-physical identification of waste.
Figure 3:
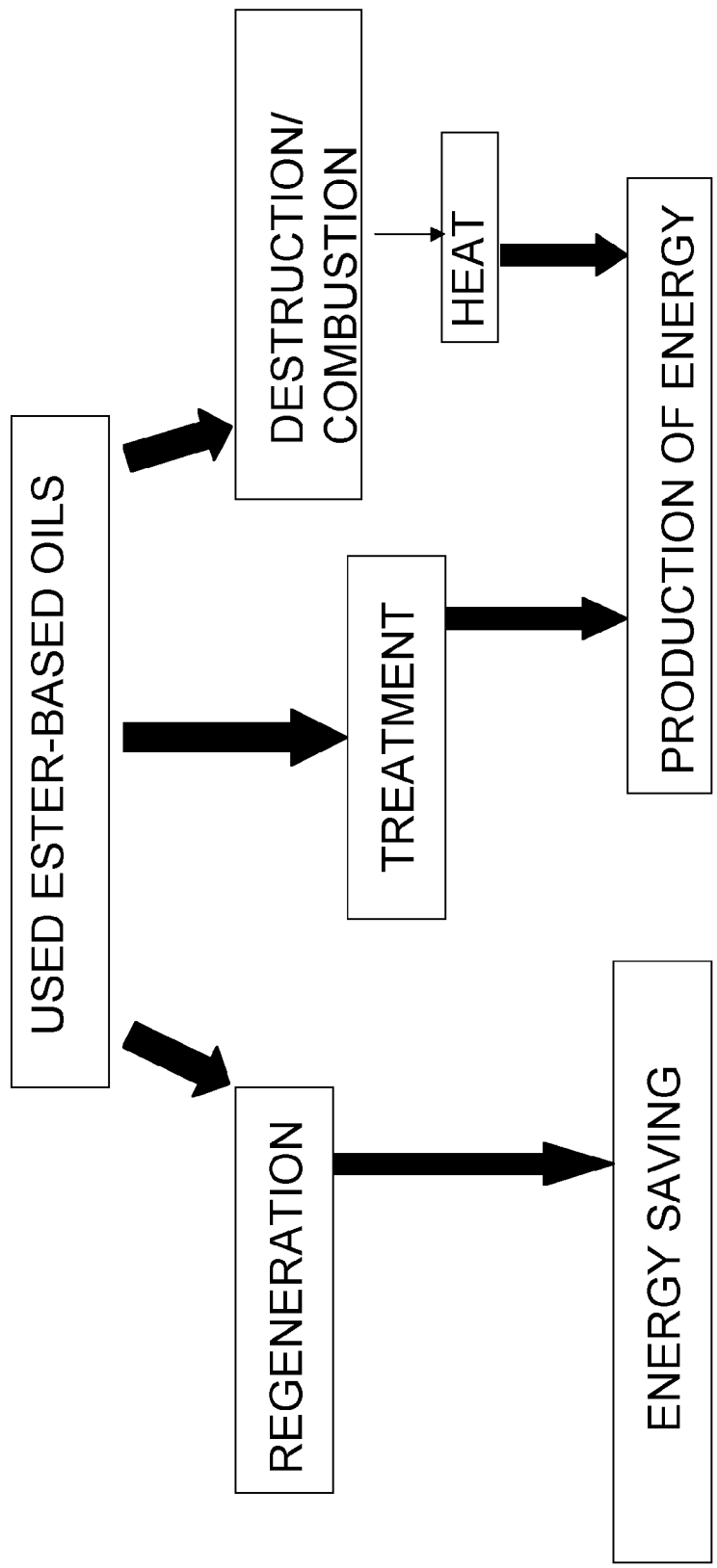
FIG. 3 is a block diagram showing the possible uses of waste.

Therefore, the method of the present invention provides a first identification to be made in the waste producing step in order to make a first distinction between used mineral oil and ester-based oil/grease of industrial origin.

According to a possible embodiment of the method, the facility or body dealing with waste collection (and in case dealing also with regeneration and/or treatment) informs the waste producer of the fact that all the acquired ester-based oils/greases cannot be mixed with one or more mineral-based oils.

It has to be considered that lubricating oils are composed of a base and of various additives: the base for example can be a mineral base that is a hydrocarbon base, polyalphaolefin base, polyglycol base, and/or a biodegradable synthetic base of ester nature.

The producer 1 of used oils therefore keeps such "ester base" waste separated from used mineral-basedoils.

A check can be made by means of the product load/unload register.

The waste that is the object of the present invention is therefore separated and stored in special containers and/or is identified by a code or by a suitable element identifying its ester nature.

According to an embodiment the code is in the form of a label containing information about the ester nature of the product, in the form of a barcode to be applied or marked on the surface of the waste container or in the form of a R-fid tag.

According to a further variant it is possible to provide the waste object of the present invention to be collected at the site of production into special containers, having a shape, a colour different than containers used for used oils of mineral origin.

Possible sources of ester-based oils or greases to be used as a starting point for the present method are: oils deriving from the deoiling of filtering and bleaching earths, vegetable ester-based oils used into electric transformers, synthetic ester-based oils used in electric transformers, vegetable used in metal quenching, oils ester-based oils used in metal cementation, oils and greases used in metal rolling, vegetable oils used as hydraulic oils, hydraulic oils for earth-moving machines, high flash point hydraulic oils for steel mills, esters used as hydraulic oils, esters used as biodegradable lubricating oils, and/or emulsionable oils. Said oils/greases can be found into the waste individually or mixed together.

Obviously the ester-based lubricating oils/greases can be mixed with additives that modify their chemical and physical properties, and said additives, at the end of the cycle of use of the oil/grease, are found in the waste.

The table below shows the oils/greases that can be used for the method of the present invention, their origin (nature), they being by-products or waste deriving from industrial cycles, and their general compositions.

| TYPE | NATURE | COMPOSITION |
|---|---|---|
| Oils deriving from deoiling of filtrating | Oils obtained by extracting by solvents (hexane) filtering earths. These are very | Triglycerides: 75-95% Fatty acids: 3-10% Unsaponifiable: 3-10% |

-continued

| TYPE | NATURE | COMPOSITION |
| --- | --- | --- |
| and bleaching earths | oxidized oils and are rich in unsaponifiables. | Polymers: 3-10% |
| Vegetable oils used in electric transformers | Vegetable oils of different composition (usually high oleic oils), very oxidized | Triglycerides: 80-95% Fatty acids: 1-5% Polymers: 5-15% |
| Synthetic esters used in electric transformers | Biodegradable polyhydric alcohols, very oxidized | Esters: >95% Oxidation products and impurities: <5% |
| Vegetable oils used in metal quenching | Oils kept at a temperature of about 80° C. wherein metal parts are immersed at about 800 degrees to be quenched. The oils undergoes a strong thermal shock and it contains metal parts and oxides | Triglycerides: 65-75% Polymers: 15-30% Fatty acids: 5-25% Insoluble substances: 1-8% |
| Oils used in metal cementation | Oils kept at a temperature of about 80° C. wherein metal parts are immersed at about 800 degrees to be quenched. The oils undergoes a strong thermal shock and it contains metal parts and oxides. Very oxidized oils due to repeated sudden changes of temperature | Triglycerides: 65-75% Polymers: 15-30% Fatty acids: 5-25% Insoluble substances: 1-8% |
| Oils and greases used in metal rolling | Vegetable and animal oils and greases. They have a high content of water and metal powders and are contaminated by mineral oils | Triglycerides: 65-75% Soaps: 5-20% Metal soaps: 3-5% Mineral oils: 3-5% |
| Vegetable oils used as hydraulic oils | Vegetable oils with small amounts of additives used as hydraulic oils with high flash point and biodegradable | Triglycerides: >90% Oxidation products: 1-5% Insoluble substances: 1-5% |
| Esters used as hydraulic oils | Esters with small amounts of additives used as hydraulic oils with high flash point and biodegradable | Esters: >90% Oxidation products: 1-5% Insoluble substances: 1-5% |
| Esters used as biodegradable lubricating oils (ex. gear oils) | Esters with small amounts of additives used as industrial oils with high flash point and biodegradable | Esters: >90% Oxidation products: 1-5% Insoluble substances: 1-5% |

Obviously said table is by way of example, and any ester-based used oil or grease of industrial production, considered individually or in a mixture, can be a base for the method of the present invention.

The method of the present invention, after a first distinction of ester-based oil/grease from mineral oil/grease 101, also provides a chemical characterization step 102 of the waste that is the waste is chemically identified such that it can fall within at least a specific type of waste or into a relevant class that will define the waste destination.

It is possible to provide for the waste to be used for different targets, that is it can have such chemical and physical properties to be regenerated, but for example also to be used for producing biodiesel.

The characterization step can occur before or during the step of gathering/storing the waste in at least a collection facility.

According to one embodiment, the characterization step 102 provides the waste to be assigned with an identification code on the basis of its relevant class: the relevant class, and so the assigned code, defines the following regeneration or treatment step and/or the following reuse step 103.

It is possible to provide for said chemical characterization to take place during the waste production and separation step.

The site of production 1, therefore, must be informed about available classes or types and about the chemical and physical properties used for assigning the waste to one class or another.

In this case, the waste producing facility or plant shall separate the waste from the mineral-based oil/grease or from the mineral-based oil/grease mixture and shall carry out the chemical identification such as to define and put the waste within a specific class.

In this case during the production phase it is possible to have an oil/grease with an identification code or element confirming that it is an ester-based oil/grease with a specific composition, allowing it to fall within a specific class.

Alternatively the chemical-physical characterization step 102 occurs at the collection facility or plant.

In this case the producer 1 identifies its waste as an ester-based oil/grease.

This waste with a "specific waste code" is collected and transported to the collection facility 2.

Here, it is chemically and physically examined and on the basis of its chemical and physical properties it falls within a specific product type 102.

On the basis of such type, an identification code is given to it, the following regeneration step 104, treatment step 105, or reuse of the identified waste will be based thereon.

The term regeneration means the waste being converted, by separation and distillation processes, into raw material from which it derives, namely, the oil or the oil mixture contaminated with water and/or solvents is treated in such a way that the starting chemical and physical properties are recovered, and the oil can be reused for the objects for which it has been produced or for similar objects.

The chemical-physical characterization allows the waste to be classified into a least one of the following classes:

waste containing natural and/or synthetic ester-based oil/grease or mixtures of natural and/or synthetic ester-based oils/greases suitable for the regeneration process, waste containing natural and/or synthetic ester-based oil/grease or mixture of natural and/or synthetic ester-based oils/greases which waste cannot be regenerated but, after a specific treatment, in the reuse step, it is made suitable for the production of electrical energy by the combustion of the treated waste, for example by supplying combustion engines, particularly diesel engines for producing electrical energy, waste containing natural and/or synthetic ester-based oil/grease or mixture of natural and/or synthetic ester-based oils/greases which waste cannot be regenerated but, after a specific treatment, in the reuse step, it is made suitable for the production of second generation biodiesel, waste containing natural and/or synthetic ester-based oil/grease or mixture of natural and/or synthetic ester-based oils/greases mixed with at least a metal or with at least another compound which waste cannot be regenerated or treated, but in the reuse step, it is made suitable for the thermal destruction or combustion with the recovery of produced heat.

Particularly after the analyses, when the collected waste cannot be classified as a regenerable or treatable oil/grease, namely, is it not suitable for being regenerated (scission/distillation for obtaining again the starting raw material of the waste) and for being treated (that is the removal of carbon residues and metal oxides of used oils for obtaining a reusable base) for the production of electrical "green" energy by the combustion of the waste or for the production of second generation biodiesel. It can be sold or given to cement factories where it is suitably burnt for killing contaminants, releasing into the environment controlled emissions and exploiting the calorific power for baking the clinker (the basic component of the cement). As an alternative, or in combination, the waste that cannot be subjected to regeneration or treatment may be subjected to thermal destruction, thus eliminating the potential harmful effect that the waste could have on the environment and thus contemporaneously recovering heat to be used, for example, for producing vapour used into a turbine producing electrical energy, or for district heating.

The waste that cannot be regenerated or treated for producing biodiesel or for producing electrical energy must be sent to thermal destruction due to the high amount of contaminants.

It is possible to provide the collection and storage step and the regeneration or treatment step, and possibly also the destruction step that produces heat to occur in a single facility or plant.

As an alternative, it is possible to provide the waste product to be first transported to a collection facility or plant 2, and then to a regeneration 3 or treatment 4 or destruction 5 facility or plant.

In this case, in the collection plant 2 the identification code or element can be applied on the product container, for example a barcode or a R-fid tag containing information about the type of waste, such that it can be sorted into a specific regeneration 3 or treatment 4 or reuse facility or plant, or when the regeneration facility or plant can process different types of waste, that is more than one type of waste, the waste code allows the waste to be sent to the proper regeneration, treatment, or reuse line.

According to the present invention, the method provides at least a treatment step 103 for the waste classified as waste suitable for the production of electrical energy, which treatment step provides the waste to be treated in order for it to meet the specifications.

The treatment made for it to meet the specifications has at least one of the following steps:
  acid treatment for removing soaps and heavy metals,
  filtration, and
  partial esterification with mono and polyalcohols, particularly glycerin, for killing the free acidity and in order to have all the waste in the form of ester.

As an alternative, the method provides at least a treatment step 103 for the waste classified as being suitable for producing second generation biodiesel, which treatment step provides the waste to be treated in order to meet the specifications.

The treatment for meeting the specifications has at least one of the following steps:
  acid treatment for removing soaps and heavy metals,
  esterification of acids by glycerine and pure methanol or exhausted methanol from waste,
  transesterification with pure methanol or exhausted methanol from waste, and
  distillation of the methyl ester by fractional distillation separating the components containing sulphur, pitches, and other impurities.

The waste treatment step 103 for obtaining second generation biodiesel leads to obtain a mixture of polyhydric alcohols such as glycerine, trimethylpropane, neopentul glycol, pentaerythritol as the reaction by-product that can be used for producing biogas by fermentation and/or thermal destruction with heat recovery.

Obviously the waste can be identified by an element or a code used for knowing not only the type to which the waste belongs and therefore the process to which it is destined, but the identification code or element of the waste can contain also other useful information.

For example, the identification code can be placed on an R-fid tag containing information such as the amounts and the origin of the product, the producer data. Such information can be useful for other reasons, for example, for preparing estimates about the production and origin of the products or in order to define bonus, for example fiscal advantages for companies that increase the use of ecologically sustainable compounds in their lines.

The present invention relates also to a plant for the separate collection and conversion for the reuse of waste containing ester-based oils/greases of industrial origin for energy purposes.

The plant provides:
  means for collecting and storing waste,
  means for the chemical-physical characterization of waste,
  means for assigning at least an identification element or code of the waste,
  means for reading or identifying said element or code, and/or
  means for regenerating or treating and/or using the waste on the basis of the assigned element or code.

As described above, the term waste means a ester-based oil/grease or a mixture of ester-based oils and/or greases, in some cases mixed with additives and decomposition products deriving from the use of the oil or grease (for example oxidation products).

The waste of the present invention is from used oils having a different origin in the production step, it being a by-product or a waste deriving from treatments, deriving from treatments, in particular industrial treatments.

Therefore, during such step the waste is subjected to a first identification as "ester-based waste".

Said identification can occur by assigning at least an identification element or code.

Said identification element or code of the waste can be composed of:
  at least a specific container wherein the waste is stored, particularly a container with a shape and/or a colour different than that used for collecting used oils with different origin, which is given by the facility where waste is collected and/or regenerated/treated,
  at least a label made of plastic or the like to be applied on the container, and/or
  at least a code, for example a barcode or a R-fid tag, for example a barcode on an adhesive label, which is applied to the container where the waste of the present invention is stored.

Said elements or codes can be provided in combination or alternatively to one another.

Such identification code or element prevent the different types of oil (mineral oil, ester-based oil) from being confused each other this leading to disposal and reuse problems.

The waste identified as a waste containing an ester-based oil/grease or a mixture of ester-based oils/greases, containing also additives if any, is transferred to a collection plant or facility 2.

It is possible to provide the collection facility or plant 2 to operate also as a regeneration facility 3, or a treatment facility 4, or reuse facility for the waste, wherein the term reuse means the use for the production of biodiesel, the use for the production of electrical energy or the thermal destruction for producing heat.

The waste, preferably in the collection facility 2, is chemically-physically identified such that the waste can be assigned to a class or a type selected from a specific amount of product classes or types.

Generally speaking as described above it is possible to define at least four classes or types for the waste to fall therein that is the waste can fall within at least one of said classes or types:
- waste suitable for regeneration,
- waste suitable for the treatment for the production of biodiesel,
- waste suitable for the treatment for the production of electrical energy, and
- waste suitable for thermal destruction or combustion for the production of heat.

An identification element or code is assigned to each one of said classes, for example it is possible to add information about the relevant class and therefore information about the final destination of the waste (regeneration, treatment for the production of electrical energy or biodiesel, thermal destruction with heat recovery) to the R-fid tag containing information about the type of waste that is "ester-based waste".

It is possible to provide said process assigning the identification element or code of the waste, both the code identifying the waste as a waste composed of ester-based oils and the code used for classifying the waste according to the above listed classes, to be completely automated as well as it is possible to provide all the steps concerning the use of the waste up to the step sending the waste to the regeneration, treatment or reuse processes to be automated.

Such automation is possible by means of the code or codes given to the waste which can be automatically read by the equipment of the plant dealing with the collection and separation.

An example of the waste treatment by means of the method and plant of the present invention for example provides a specific industrial plant to produce as a waste a mixture of used oils composed of ester-based oils, for example esters used as biodegradable lubricating oils.

Such oils are kept separated from oils of different origin, such as mineral lubricating oils, both during the use phase and the rejection phase.

Therefore, the waste is identified as "ester-based waste" in the site of production and therefore it is suitable for the separate collection.

The identification can take place by collecting waste into suitable containers that can be different as regards the shape, colour, and dimensions, from containers holding used mineral oils, and/or by applying on "ester-based waste" containers an adhesive or a label with a barcode containing at least the "ester-based waste" indication.

Waste is collected and transported to a collection facility where it will be subjected to a second identification that will define its chemical-physical properties and it will be assigned to a specific class or type.

Therefore, on the basis of the relevant class, a second identification element or code is assigned to the waste.

The chemical-physical composition for example makes the waste suitable for being sent to a treatment step converting it into a starting product for the production of biodiesel.

Therefore, the collection facility gives the waste the proper code that identifies the relevant class, for example, an R-fid tag, or a label, or an adhesive with a barcode is applied to the waste container, which can be read by automatic reading means.

On the basis of the class the product belongs to, it is sent to a specific treatment facility where it will be converted into the starting product for the production of biodiesel.

It is possible to provide the waste treatment plant or facility to be able to treat and convert waste falling within different classes, for example the collected waste can be sent to an oil regeneration and treatment facility able to regenerate used oils, to treat used oils in order to make them suitable for the production of biodiesel, and to treat used oils for make them suitable to be used in engines for producing electrical energy.

In this case, the identification code, specifically the R-fid tag, will be able to determine the branch of the plant that is the treatment line to which the waste has to be assigned.

As described above, by the provision of means automatically reading the codes, the waste treatment process, from when the waste enters into the regeneration/treatment facility to when the treated waste is sent away for being reused, can be completely automated.

The plant of the present invention operates by using codes identifying the product and these codes define the waste destination.

According to one embodiment, the code is contained in an R-fid tag.

According to one embodiment, the containers arrive at the collection facility and/or to the regeneration/treatment facility and are managed in an automated manner by means of the identification element or code applied on the container.

Means transporting containers and reading the codes can be automated.

The reading means in the plant reads the waste code and, following the reading thereof, the waste, or more specifically the container wherein the waste is collected, is sent to a specific regeneration/treatment line by means transporting and coupling the container, wherein the waste is delivered to the entrance station of a specific treatment line.

Obviously it is possible to provide for the collection plant or facility to also be a regeneration and/or a treatment facility.

In this case, waste collected from the several sites of production is brought to a single facility, and it is classified and treated or regenerated on the basis of the type to which it belongs.

In the case where the waste is classified as not suitable to be regenerated or treated for producing "green" energy, that is ecologically sustainable energy, it can be sent from the collection facility to a facility where it will be subjected to thermal destruction or combustion for heat recovery.

Obviously it is possible to provide collection facilities and/or regeneration/reuse facilities that are able also to subject waste to thermal destruction for recovering the heat produced therefrom.

The present invention has several advantages:
- it makes it possible to use, directly or indirectly, for energy purposes an industrial waste that up to now has never been used but that has been collected in a not separate manner, as a component contaminating the mixture of used mineral oils. That is, it makes it possible to obtain from a new waste an energy saving, by means of the regeneration process that brings again in the industrial cycle a product that otherwise would be rejected, or energy production by means of the conversion into raw material for producing electrical energy or biodiesel, or by producing heat,
- it provides a lot of raw material to companies producing second generation biodiesel (currently second generation biodiesel can be obtained only from used fried oils, collected by the consortium C.O.N.O.E.)
- it provides a lot of raw material to be used for producing energy without impacts on the ecosystem that are due to deforestation and transport of the raw material from one site to another site which cause large emissions of carbon dioxide due to the combustion of conventional fuels,
- it allows the country that will apply the method of the present invention to observe the Kyoto protocol as regards the emissions of carbon dioxide into the environment since the method of the present invention provides to use renewable sources that is ester-based oils produced by industrial processes for producing energy, it allows the separate collection process and the treatment/regeneration processes for used oils/greases in particular ester-based oils/greases to become more easy and quick, and therefore inexpensive, and it allows used ester-based oils/greases to be properly disposed without affecting the collection and reuse process of oils/greases of different nature, for example the collection and reuse of mineral lubricant oils.

The invention claimed is:

1. A selective collection and conversion method for the reuse of used oils and greases for energy purposes, which method comprises the following steps:
    (a) producing and separating ester-based waste from other substances or compounds;
    (b) collecting the waste;
    (c) gathering/storing the waste in at least one of a collection facility and a regeneration facility;
    (d) regenerating or treating the waste; and
    (e) reusing the collected or regenerated or treated waste, wherein step (c) further comprises a chemical-physical characterization step (c1) for the waste, during which said waste is chemically and physically identified such that it falls within at least a specific relevant class chosen among one of the following:
    (I) waste containing at least one of a natural ester-based oil/grease and a synthetic ester-based oil/grease suitable for the regeneration process;
    (II) waste containing at least one of a natural ester-based oil/grease and a synthetic ester-based oil/grease, which waste cannot be regenerated but, after a specific treatment, in the reuse step, it is made suitable for the production of electrical energy;
    (III) waste containing at least one of a natural ester-based oil/grease and a synthetic ester-based oil/grease, which waste cannot be regenerated but, after a specific treatment, in the reuse step, it is made suitable for the production of second generation biodiesel; and
    (IV) waste containing at least one of a natural ester-based oil/grease and a synthetic ester-based oil/grease, which waste cannot be regenerated or treated, but in the reuse step, it is made suitable for the thermal destruction or combustion with the recovery of produced heat,
    wherein said waste is at least one of an oil and a grease containing at least one of a natural ester-based oil/grease and/or synthetic ester-based oil/grease, and wherein said waste is the by-product or waste of an industrial processes.

2. The method according to claim 1 characterized in that the waste production and separation step provides natural and/or synthetic, ester-based oils/greases to be separated from oils/greases with a different base.

3. The method according to claim 1, characterized in that waste comprises at least one of: an oil derived from the deoiling of filtering and bleaching earths, a vegetable ester-based oil used to electric transformers, a synthetic ester-based oil used in electric transformers, a vegetable ester-based oil used in metal quenching, an oil used in metal cementation, an oil used in metal rolling, a grease used in metal rolling, a vegetable oil used as hydraulic oils, a hydraulic oil for earth-moving machines, a high flash point hydraulic oil for steel mills, an ester used as a hydraulic oil, an ester used as a biodegradable lubricating oil, and an emulsifiable oil.

4. The method according to claim 1, characterized in that the characterization step provides the waste to be assigned with an element or code identifying the relevant class for the following regeneration or at least one of the treatment step and the following reuse step.

5. The method of claim 1, further comprising a treatment step for the waste classified as waste suitable for the production of electrical energy, which treatment step provides to lead the waste to meet the specifications and provides at least one of the following steps:
    acid treatment for removing soaps and heavy metals,
    filtration, and
    partial esterification with mono and polyalcohols, particularly glycerin, for killing the free acidity and in order to have all the waste in the form of an ester.

6. The method of claim 1, further comprising a treatment step for the waste classified as being suitable for producing second generation biodiesel, which treatment step provides to lead the waste to meet the specifications and provides at least one of the following steps:
    acid treatment for removing soaps and heavy metals,
    esterification of acids by glycerine and pure methanol or exhausted methanol from waste,
    transesterification with pure methanol or exhausted methanol from waste, and
    distillation of the methyl ester by fractional distillation separating the components containing sulphur, pitches and other impurities.

7. The method according to claim 6 characterized in that the waste treatment step for obtaining second generation biodiesel leads to obtain a mixture of polyhydric alcohols as the reaction by-product that can be used for at least one of producing biogas by fermentation and thermal destruction with heat recovery.

* * * * *